(12) United States Patent
Luttmann

(10) Patent No.: US 7,080,189 B1
(45) Date of Patent: Jul. 18, 2006

(54) USB DEVICE COMMUNICATION

(75) Inventor: Eric J. Luttmann, Star, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 391 days.

(21) Appl. No.: 10/160,442

(22) Filed: May 31, 2002

(51) Int. Cl.
G06F 13/20 (2006.01)

(52) U.S. Cl. .................................... 710/313

(58) Field of Classification Search ............... 710/305, 710/315, 313
See application file for complete search history.

(56) References Cited

U.S. PATENT DOCUMENTS

| | | | | |
|---|---|---|---|---|
| 5,974,486 A * | 10/1999 | Siddappa | .................. | 710/53 |
| 6,122,676 A * | 9/2000 | Brief et al. | .................. | 710/9 |
| 6,233,640 B1 * | 5/2001 | Luke et al. | .................. | 710/315 |
| 6,389,495 B1 * | 5/2002 | Larky et al. | .................. | 710/8 |
| 6,415,343 B1 * | 7/2002 | Fensore et al. | .......... | 710/104 |
| 6,529,988 B1 * | 3/2003 | Yoshikawa et al. | ........ | 710/305 |
| 6,615,306 B1 * | 9/2003 | Ajanovic | .................. | 710/305 |
| 6,618,788 B1 * | 9/2003 | Jacobs | .................. | 710/315 |
| 6,678,761 B1 * | 1/2004 | Garney et al. | .............. | 710/60 |
| 6,684,272 B1 * | 1/2004 | Leete et al. | .................. | 710/52 |
| 6,718,412 B1 * | 4/2004 | Purcell et al. | ............ | 710/109 |
| 6,760,852 B1 * | 7/2004 | Gulick | .................. | 713/324 |
| 6,816,929 B1 * | 11/2004 | Ueda | .................. | 710/56 |
| 6,816,976 B1 * | 11/2004 | Wright et al. | ............ | 713/323 |
| 2002/0169905 A1 * | 11/2002 | Ishida et al. | ............. | 710/100 |

\* cited by examiner

*Primary Examiner*—Rehana Perveen
*Assistant Examiner*—Christopher Daley
(74) *Attorney, Agent, or Firm*—Marger Johnson & McCollom, P.C.

(57) ABSTRACT

A method of communicating between a host and a USB-connected device is provided, in which a first and second phase of a communications protocol are asynchronously transmitted between the host and the device. A third phase of the communications protocol can also be asynchronously transmitted with the first and second phases. The USB-connected device can be a mass storage device and the communications protocol can be a bulk-only transport protocol having a command phase, a data phase, and a status phase.

25 Claims, 8 Drawing Sheets

Synchronous Method

| Transaction 279 | IN 0x96 | ADDR 1 | ENDP 2 | T 0 | Data 512 bytes | ACK 0x4B | Time 12.233 μs | |
|---|---|---|---|---|---|---|---|---|
| Transaction 280 | IN 0x96 | ADDR 1 | ENDP 2 | T 1 | Data 512 bytes | ACK 0x4B | Time 14.900 μs | |
| Packet 892 | SOF 0xA5 | Frame # 1232.7 | CRC5 0x1D | EOP FF FF FF FF FF FE | | Time 366 ns | Time-stamp 00000.0167 4109 | |
| Transaction 281 | IN 0x96 | ADDR 1 | ENDP 2 | T 0 | Data 512 bytes | ACK 0x4B | Time 12.067 μs | |
| Transaction 282 | IN 0x96 | ADDR 1 | ENDP 2 | T 1 | Data 512 bytes | ACK 0x4B | Time 112.567 μs | |
| Packet 899 | SOF 0xA5 | Frame # 1233.0 | CRC5 0x02 | EOP FF FF FF FF FF FE | | Idle 124.804 μs | Time-stamp 00000.0168 4109 | |
| Packet 900 | SOF 0xA5 | Frame # 1233.1 | CRC5 0x02 | EOP FF FF FF FF FF FE | | Time 26.333 μs | Time-stamp 00000.0169 4109 | |
| Transaction 283 | IN 0x96 | ADDR 1 | ENDP 2 | T 0 | Data 13 bytes | ACK 0x4B | Time 98.633 μs | |
| Packet 904 | SOF 0xA5 | Frame # 1233.2 | CRC5 0x02 | EOP FF FF FF FF FF FE | | Time 107.700 μs | Time-stamp 00000.0170 4107 | |
| Transaction 284 | OUT 0x87 | ADDR 1 | ENDP 1 | T 1 | Data 31 bytes | ACK 0x4B | Time 17.300 μs | |
| Packet 908 | SOF 0xA5 | Frame # 1233.3 | CRC5 0x02 | EOP FF FF FF FF FF FE | | Time 104.900 μs | Time-stamp 00000.0171 4107 | |
| Transaction 285 | IN 0x96 | ADDR 1 | ENDP 2 | T 1 | Data 512 bytes | ACK 0x4B | Time 20.067 μs | |
| Packet 912 | SOF 0xA5 | Frame # 1233.4 | CRC5 0x02 | EOP FF FF FF FF FF FE | | Time 366 ns | Time-stamp 00000.0172 4105 | |
| Transaction 286 | IN 0x96 | ADDR 1 | ENDP 2 | T 0 | Data 512 bytes | ACK 0x4B | Time 11.767 μs | |
| Transaction 287 | IN 0x96 | ADDR 1 | ENDP 2 | T 1 | Data 512 bytes | ACK 0x4B | Time 11.733 μs | |

FIG. 4
(BACKGROUND ART)

Asynchronous Method

| Transaction | | IN | ADDR | ENDP | T | Data | ACK | Time | |
|---|---|---|---|---|---|---|---|---|---|
| 4417 | S | 0x96 | 1 | 2 | 0 | 512 bytes | 0x4B | 12.000 μs | |

| Transaction | | IN | ADDR | ENDP | T | Data | ACK | Time | |
|---|---|---|---|---|---|---|---|---|---|
| 4418 | S | 0x96 | 1 | 2 | 1 | 512 bytes | 0x4B | 11.867 μs | |

| Transaction | | IN | ADDR | ENDP | T | Data | ACK | Time | |
|---|---|---|---|---|---|---|---|---|---|
| 4419 | S | 0x96 | 1 | 2 | 0 | 512 bytes | 0x4B | 12.333 μs | |

| Transaction | | IN | ADDR | ENDP | T | Data | ACK | Time | |
|---|---|---|---|---|---|---|---|---|---|
| 4420 | S | 0x96 | 1 | 2 | 1 | 512 bytes | 0x4B | 12.100 μs | |

| Transaction | | IN | ADDR | ENDP | T | Data | ACK | Time | |
|---|---|---|---|---|---|---|---|---|---|
| 4421 | S | 0x96 | 1 | 2 | 0 | 512 bytes | 0x4B | 16.333 μs | |

| Packet | | SOF | Frame # | CRC5 | EOP | Time | Time-stamp |
|---|---|---|---|---|---|---|---|
| 10950 | S | 0xA5 | 344.4 | 0x0F | FF FF FF FF FF FE | 333 ns | 00000.0511 7254 |

| Transaction | | IN | ADDR | ENDP | T | Data | ACK | Time | |
|---|---|---|---|---|---|---|---|---|---|
| 4422 | S | 0x96 | 1 | 2 | 1 | 13 bytes | 0x4B | 124.667 μs | |

| Packet | | SOF | Frame # | CRC5 | EOP | Time | Time-stamp |
|---|---|---|---|---|---|---|---|
| 10954 | S | 0xA5 | 344.5 | 0x0F | FF FF FF FF FF FE | 15.600 μs | 00000.0512 7254 |

| Transaction | | OUT | ADDR | ENDP | T | Data | ACK | Time | |
|---|---|---|---|---|---|---|---|---|---|
| 4423 | S | 0x87 | 1 | 1 | 1 | 31 bytes | 0x4B | 34.500 μs | |

| Transaction | | IN | ADDR | ENDP | T | Data | ACK | Time | |
|---|---|---|---|---|---|---|---|---|---|
| 4424 | S | 0x96 | 1 | 2 | 0 | 512 bytes | 0x4B | 12.700 μs | |

| Transaction | | IN | ADDR | ENDP | T | Data | ACK | Time | |
|---|---|---|---|---|---|---|---|---|---|
| 4425 | S | 0x96 | 1 | 2 | 1 | 512 bytes | 0x4B | 12.067 μs | |

| Transaction | | IN | ADDR | ENDP | T | Data | ACK | Time | |
|---|---|---|---|---|---|---|---|---|---|
| 4426 | S | 0x96 | 1 | 2 | 0 | 512 bytes | 0x4B | 11.867 μs | |

| Transaction | | IN | ADDR | ENDP | T | Data | ACK | Time | |
|---|---|---|---|---|---|---|---|---|---|
| 4427 | S | 0x96 | 1 | 2 | 1 | 512 bytes | 0x4B | 11.967 μs | |

| Transaction | | IN | ADDR | ENDP | T | Data | ACK | Time | |
|---|---|---|---|---|---|---|---|---|---|
| 4428 | S | 0x96 | 1 | 2 | 0 | 512 bytes | 0x4B | 26.267 μs | |

FIG. 7

USB DEVICE COMMUNICATION

BACKGROUND OF THE INVENTION

1. Field of the Invention

The present invention relates to a method of communicating between a host and a peripheral device. More particularly, this invention relates to a method of communicating between the host and the peripheral device via a USB connection.

2. Description of the Related Art

FIG. 1 is a schematic diagram illustrating a host computer system 200 connected to a USB mass storage device 100 via a USB connection 120. FIG. 2 is a high level USB system block diagram illustrating various hardware and software components for controlling a USB mass storage device 100. Referring to FIGS. 1 and 2, a USB mass storage driver 125 resides is a client USB driver that executes on the host computer system 200. The USB mass storage driver 125 provides the interface between the Operating System (OS) Storage driver stack 124 and the USB mass storage device 100. The USB Driver 132 provides the system software that supports USB on a particular OS. The Host Controller Driver (HCD) 134 provides the software layer between the host controller hardware 142 and the USB driver 132.

The USB hardware 140 includes the host controller 142, the USB 120, and the USB mass storage device 100. The host controller 142 is managed by the HCD software layer 134. The host controller hardware 142 executes a scheduled list of transactions generated by the HCD 134 and reports the status of the transactions on the USB 120 to the HCD 134. The USB mass storage device 100 is a hardware device built according to the USB Mass Storage Class (MSC) specifications. Interactions between the USB mass storage device 100 and the host computer system 200 flow through the software and hardware layers described previously.

Conventional USB MSC drivers synchronously submit the three phases (Command, Data, and Status) of a bulk-only transport protocol. This synchronous transmission scheme results in dead time between each of the three phases because each phase is separately subject to an interrupt latency based on a current interrupt threshold. FIG. 3 is a schematic block diagram illustrating the conventional synchronous method of communication. FIG. 4 is a software trace showing the timing of signals according to the conventional synchronous method of FIG. 3.

Referring to FIGS. 2, 3, and 4, according to the synchronous communication method, the communication begins with a start request in the USB mass storage driver 125 executing on the host computer system 200. In response to the start request, a command transport is submitted to the USB driver stack 130 and a setup command transaction for the host controller 142 is initiated. A command USB bulk transaction is then processed in the host controller 142. When the command transaction is completed in the USB driver stack 130, a command transport callback is received in the USB mass storage driver 125. During the processing of the command bulk USB transaction in the host controller 142, the USB Device 100 extracts the command block and executes the command.

The command phase takes place during a first frame time on the USB 120. The length of each frame corresponds with an interrupt threshold of the USB. Following the processing of the command, the USB sits idle until the end of the first frame time (i.e., completion of the first interrupt threshold period). Only after the first frame has completed can the data phase begin.

During the data phase, a data transport is submitted from the USB Mass Storage Class Driver 125 to the USB driver stack 130. A data transaction for the host controller 142 is then set up by the USB driver stack 130. The host controller 142 then processes the data USB bulk transaction. During the data USB bulk transaction, data is transmitted between the USB device 100 and the host 200 over the USB 120, as specified in the command block. When the data transaction is complete, a data transport callback is received in the USB Mass storage driver 125.

The data phase takes place during a second frame time. The next phase (status) cannot take place until the second frame has ended. The USB therefore sits idle from the completion of the data transfer and the end of the second frame.

Following the second frame, the status phase begins with the submission of the status transport from the USB mass storage driver 125 to the USB Driver stack 130. The USB driver stack 130 then sets up the status transaction for the host controller 142. The host controller 142 then processes the status USB bulk transaction. During the status USB bulk transaction, the USB device 100 returns status information regarding the execution of the command block. When the status USB bulk transaction is complete, a status transport callback is received in the USB Mass Storage driver 125 and the request is complete.

The status phase, however, takes place during a third frame time and the next transaction cannot begin until the completion of the third frame. Between the time when the status information has been returned and the completion of the third frame, the USB again sits idle.

FIG. 5 is a schematic block diagram further illustrating the problems resulting from the synchronous communications method. Referring to FIG. 5, each frame arrow 10 represents a single interrupt threshold for a USB frame. In this example, each interrupt threshold has a length of 1 ms. Accordingly, a Command phase 20, a Data phase 30, and a Status phase 40 each take one USB frame (or 1 ms) to complete. In this example, therefore, the synchronous method takes approximately 3 ms to complete all three phases of the bulk-only transport protocol, as indicated by transaction arrows 15.

SUMMARY OF THE INVENTION

According to one embodiment of the invention, a method of communicating between a host and a USB-connected device is provided, in which a first and second phase of a communications protocol are asynchronously transmitted between the host and the device. A third phase of the communications protocol can also be asynchronously transmitted along with the first and second phases.

In a preferred embodiment, the USB-connected device is a mass storage device and the communications protocol is a bulk-only transport protocol. In this embodiment, the first phase is a command phase, the second phase is a data phase, and the third phase is a status phase.

A transmission system for communicating between a host and a USB-connected device can also be provided according to another aspect of this invention. The transmission system preferably includes a first communications phase and a second communications phase. The transmission system is preferably configured to transmit the first and second communications phases asynchronously. A third phase can also be provided and asynchronously transmitted. This command transmission system can, for example, be implemented on the host. The USB-connected device can be a mass storage device.

BRIEF DESCRIPTION OF THE DRAWINGS

The foregoing and additional aspects and advantages of the present invention will become more readily apparent through the following detailed description of preferred embodiments, made with reference to the attached drawings, in which:

FIG. 4 is a software trace showing signals and timing for a synchronous USB communications method;

FIG. 7 is a software trace illustrating the signals and timing in the asynchronous transmission method of FIG. 6.

DETAILED DESCRIPTION OF PREFERRED EMBODIMENTS

The principles of the present invention will be described more fully hereinafter with reference to preferred embodiments thereof. It should be noted, however, that the following embodiments may be modified in various forms, and that the scope of the present invention is not limited to these specific embodiments. The following embodiments of the present invention are provided by way of example, and not by way of limitation.

Figure 1:
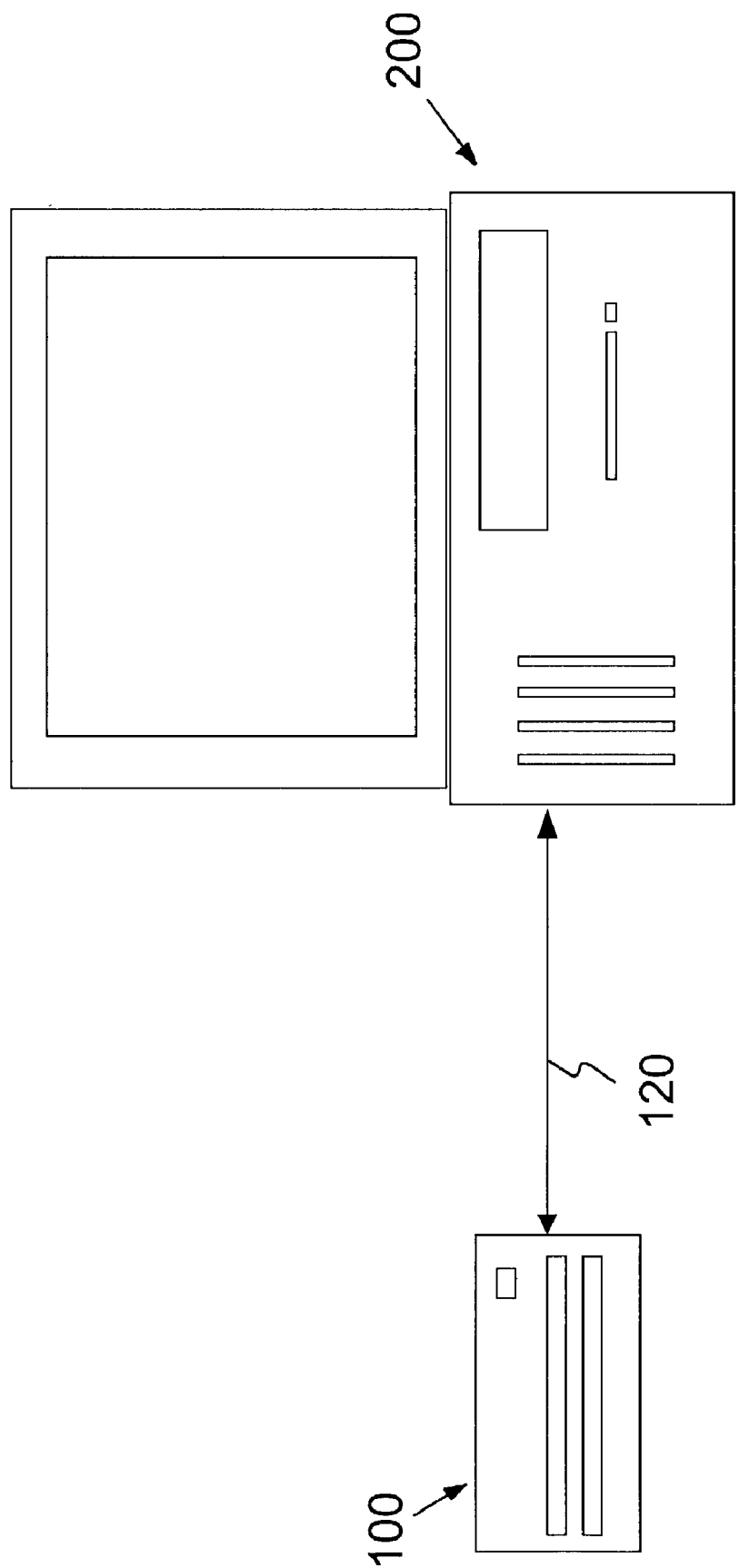
FIG. 1 is a schematic diagram of a host computer system connected to a USB mass storage device.
Figure 2:
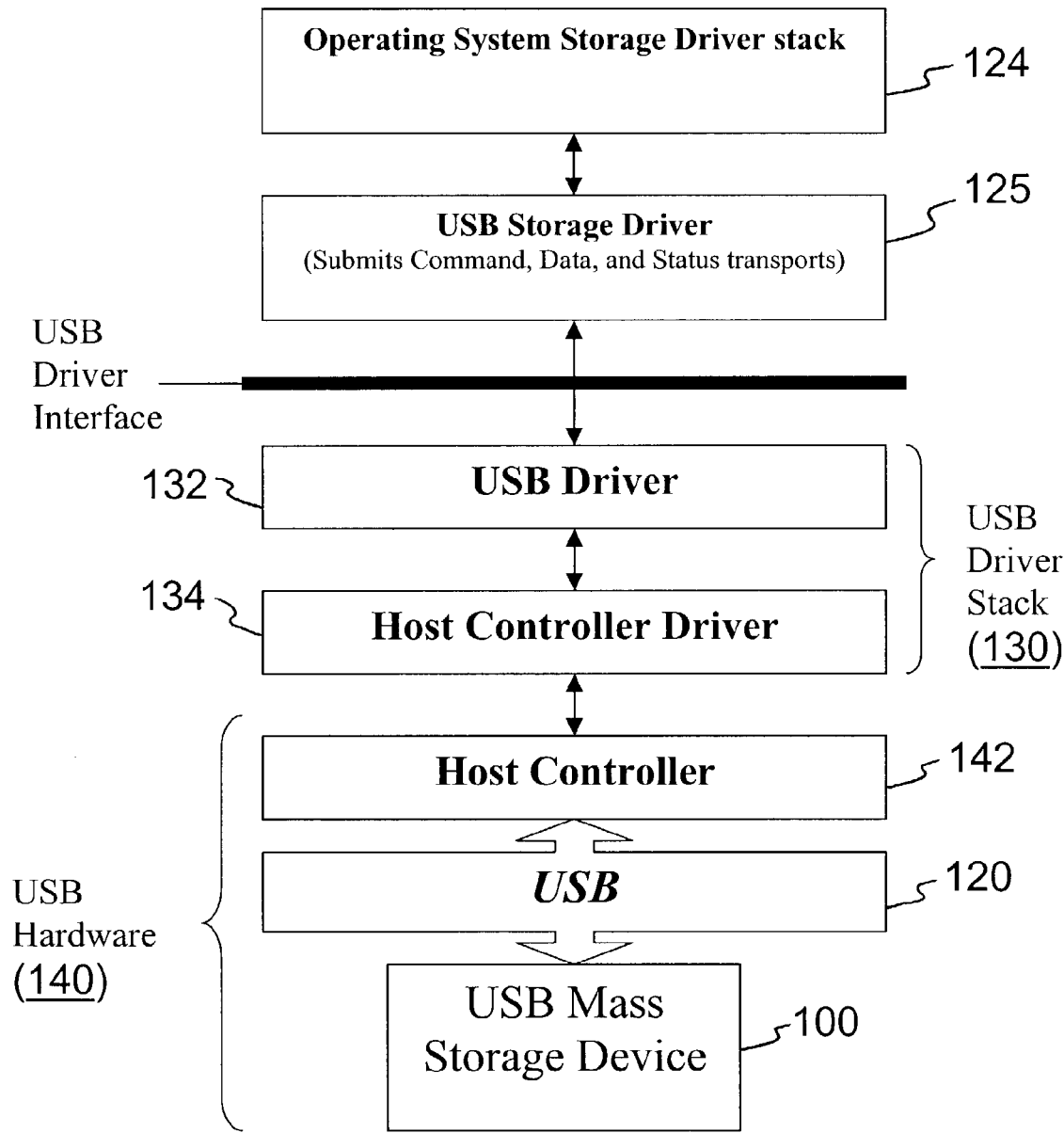
FIG. 2 is a high-level block diagram of a USB system.
Figure 3:
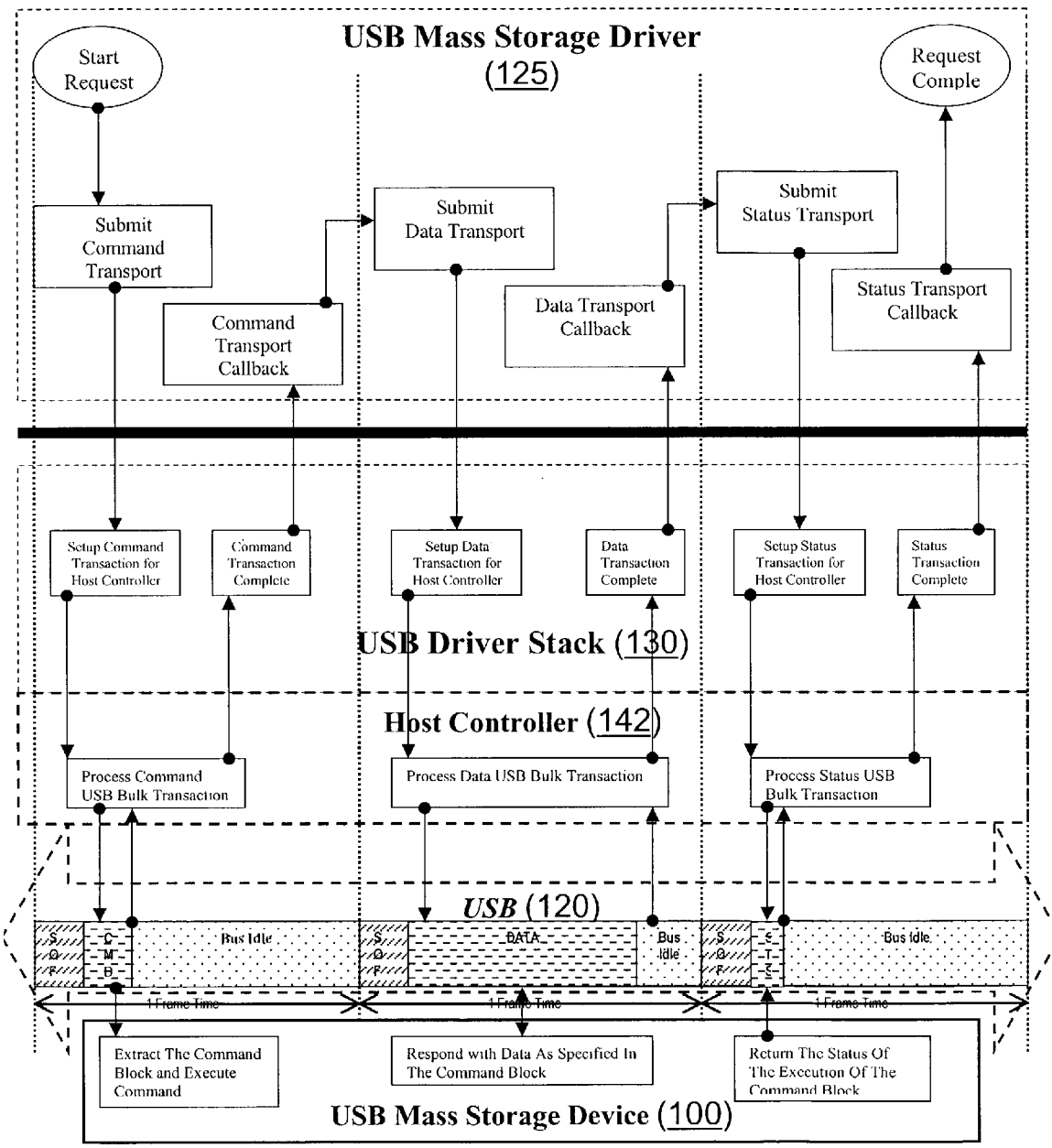
FIG. 3 is a schematic block diagram illustrating a method of synchronously communicating between a host computer system and a USB mass storage device.
Figure 6:
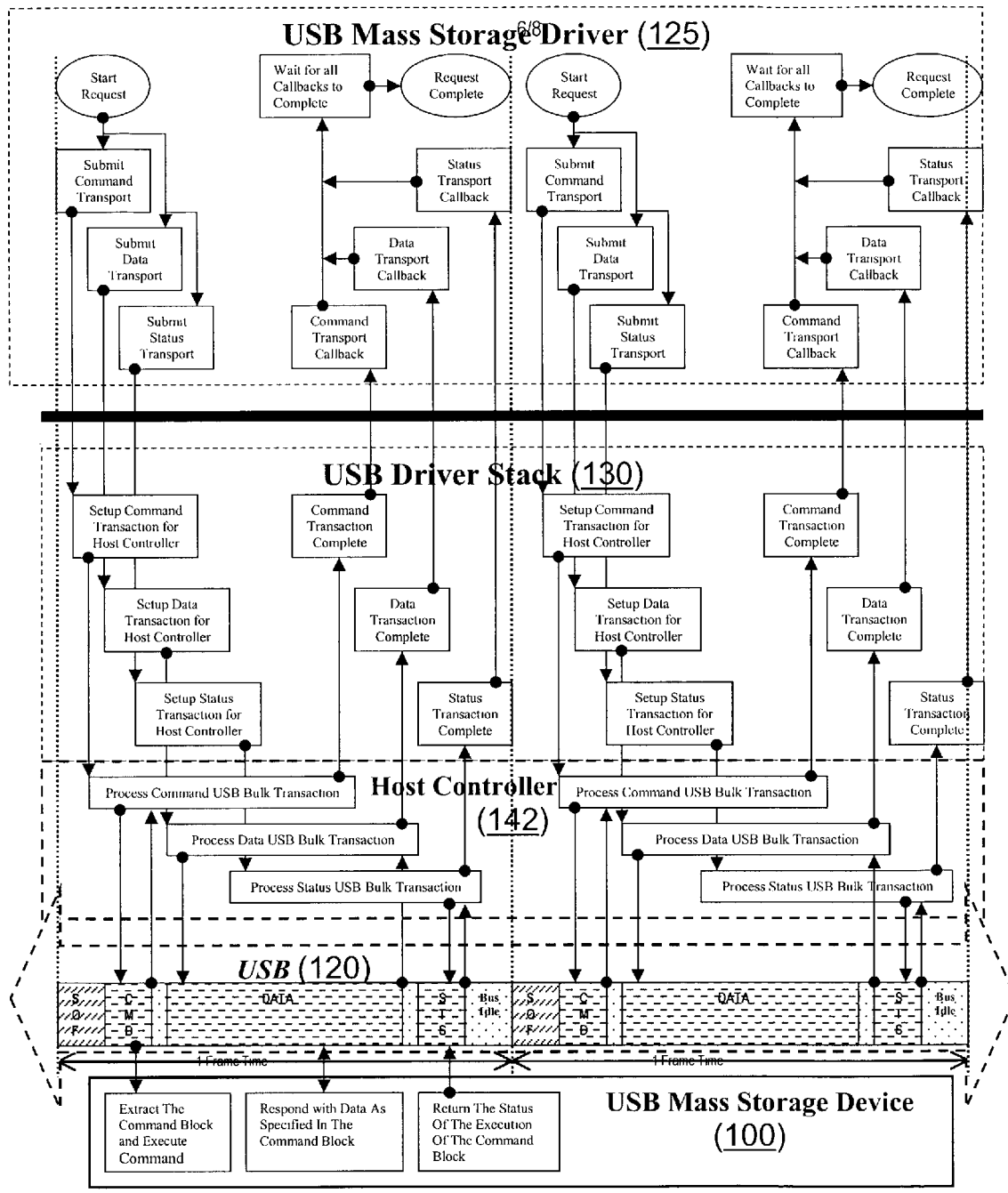
FIG. 6 is a schematic block diagram illustrating a method of asynchronously transmitting commands between a host and a USB-connected device according to a preferred embodiment of the present invention.

FIG. 6 is a schematic block diagram illustrating asynchronous signal flow between a host computer system and a USB mass storage device 100 over a USB 120, according to a preferred embodiment of this invention. Referring to FIG. 6, following a start request, the USB mass storage class driver 125 asynchronously submits the command, data, and status transports during a single USB frame, which corresponds to a single interrupt threshold period. More specifically, the USB driver stack 130 sets up the command transaction, the data transaction, and the status transaction for the host controller 142. The host controller 142 then proceeds to process the command USB bulk transaction, the data USB bulk transaction, and the status USB bulk transaction during the same frame. As a result, the USB Mass storage device 100 is able to extract and execute the command block, respond with data as specified in the command block, and return the status of execution of the command block all within a single frame. As indicated in FIG. 6, the USB therefore experiences significantly less idle time as compared with the conventional, synchronous transmission method (see FIG. 3).

Following completion of each of the bulk transactions, a callback for that transaction is received by the USB mass storage driver 125. The USB mass storage driver 125 waits to receive callbacks from each of the command, data, and status transports. Once all the callbacks have been received, the request is then complete.

FIG. 7 is a software trace illustrating various signals and timing for the asynchronous transmission method described with respect to FIG. 6. As can be seen from a comparison of FIGS. 7 and 4, the asynchronous communications method permits the phases of the communications protocol to be completed much more efficiently.

Figure 8:
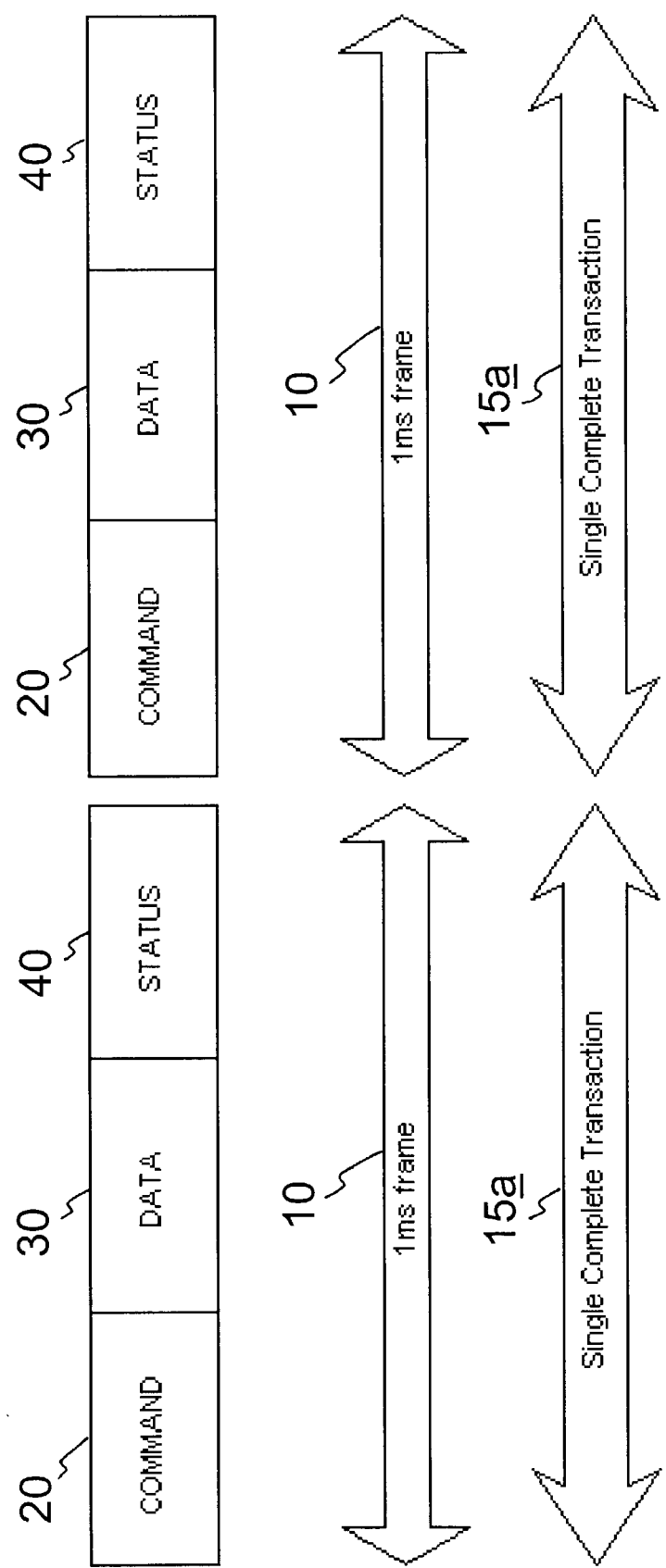
FIG. 8 is a schematic block diagram further illustrating the benefits of an asynchronous communication method.

FIG. 8 is a schematic block diagram further illustrating the benefits of the asynchronous method of transmitting phases of the bulk-only transport protocol between a host and a mass storage device. Referring to FIG. 8, according to this embodiment, the Command phase 20, Data phase 30, and Status phase 40 of the bulk-only transport protocol are submitted asynchronously. By asynchronously submitting the Command, Data, and Status phases 20, 30, 40 of the bulk-only transport protocol, the dead time between each of the three phases can be eliminated because all three phases are subject to the same interrupt latency. The example shown in FIG. 8 uses an interrupt threshold of 1 ms.

Figure 5:
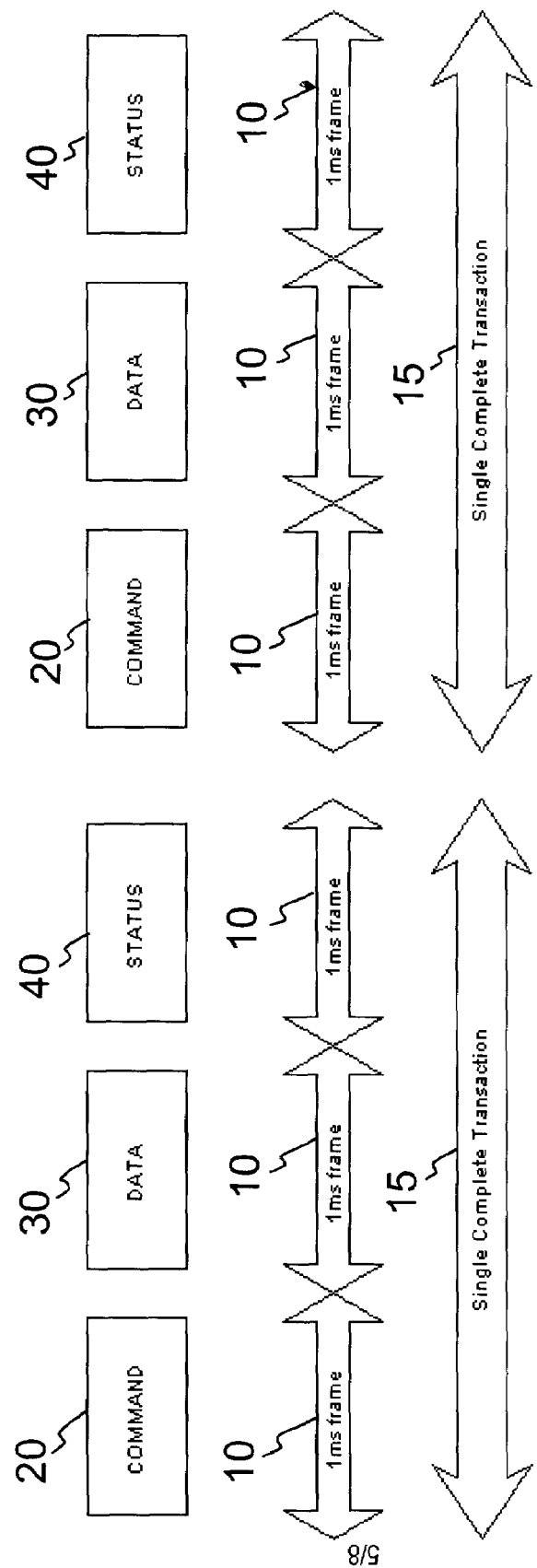
FIG. 5 is a schematic block diagram further illustrating a conventional method of synchronously communicating between a host and a USB-connected device.

The frame arrows 10 each represent a single interrupt threshold for a USB frame. Each USB frame shown has a length of 1 ms. According to this embodiment, the asynchronously submitted Command, Data, and Status phases 20, 30, 40 of the bulk-only transport protocol are all completed within a single USB frame, as indicated by transaction arrows 15a. As can be seen from a comparison of FIGS. 8 and 5, according to a preferred embodiment of this invention, all three phases of the bulk-only transport protocol can be submitted in about one-third the time of the conventional system (i.e., in only about 1 ms rather than 3 ms).

By transmitting device commands asynchronously, redundant latencies imposed by synchronous command transmission and dead time occurring between synchronous command transmissions can be eliminated. By eliminating these latencies and dead time, the preferred embodiment of the present invention is able to provide a significant improvement in overall performance of a USB-connected device. The principles of this invention therefore enable faster device access and increased communication speeds.

In summary, a preferred method of communicating between a host and a USB-connected device includes asynchronously transmitting a first phase and a second phase of a communications protocol. A third phase of the communications protocol can be asynchronously transmitted along with the first and second phases. The communications protocol is preferably a bulk-only transport protocol, having a command phase, a data phase, and a status phase. In a most preferred embodiment, the USB-connected device is a mass storage device.

According to another aspect of this invention, a transmission system is provided to enable communication between a host and a USB-connected device. The transmission system preferably includes a communications protocol having a first and second phases. The transmission system can be configured to transmit the phases of the communications protocol asynchronously. A third communications phase can also be asynchronously transmitted by the transmission system. Most preferably, this system is implemented on the host, such as in driver software running on the host to control communication with the USB-connected device. The USB-connected device is preferably a mass storage device, in which case the communications protocol can be the bulk-only transport protocol, wherein the first phase is a command phase, the second phase is a data phase, and the third phase is a status phase.

According to another method of communicating with a USB-connected device, a plurality of device commands are asynchronously submitted between a host and a device over a USB connection. The device commands are preferably phases of a communications protocol, such as a bulk-only transport protocol. The phases can, for instance, include a command phase, a data phase, and a status phase. The plurality of device commands are preferably transmitted during a single interrupt threshold period.

While the principles of this invention have been primarily shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. A method of communicating between a host and a USB-connected device, comprising:
    transmitting a first phase of a communications protocol over a USB connection; and
    transmitting a second phase of the communications protocol over the USB connection, wherein the first and second phases are transmitted during a single USB frame;
    wherein the first and second phases are transmitted according to a predetermined transmission schedule.

2. A method according to claim 1, fiber comprising transmitting a third phase of the communications protocol during the single USB frame.

3. A method according to claim 1, wherein the single USB frame is approximately 1 ms in duration.

4. A method according to claim 1, wherein the communications protocol is a bulk-only transport protocol, wherein the first phase is a command phase, and wherein the second phase is a data phase.

5. A method according to claim 1, wherein the transmission of multiple phases during a single USB frame reduces latency and increases transmission speed.

6. A method according to claim 2, wherein the third phase is a status phase.

7. A method according to claim 1, wherein the USB-connected device is a mass storage device, and wherein the method increases a speed of communication with the mass storage device by reducing latency.

8. A method according to claim 7, wherein the communications protocol is a bulk-only transport protocol.

9. A method according to claim 8, further comprising transmitting a third phase of the transmission protocol during the single USB frame, wherein the first phase comprises a command phase, wherein the second phase comprises a data phase, and wherein the third phase comprises a status phase.

10. A transmission system for communicating between a host and a USB-connected device, comprising:
    a first communications phase; and
    a second communications phase, wherein the transmission system is preconfigured to transmit the first and second communications phases asynchronously during a single USB frame, said preconfiguring occurring before transmission of either phase.

11. A system according to claim 10, further comprising a third communications phase.

12. A system according to claim 10, wherein the command transmission system is implemented on the host.

13. A system according to claim 10, wherein the USB-connected device is a mass storage device.

14. A system according to claim 10, wherein the first phase is a command phase, wherein the second phase is a data phase, and wherein the third phase is a status phase.

15. A method of communicating with a USB-connected device, comprising:
    preconfiguring a host to transmit a plurality of device commands between a host and a device over a USB connection during a single USB frame, said preconfiguring taking place in advance of beginning transmission;
    transmitting the plurality of device commands between the host and the device over the USB connection during the single USB frame.

16. A method according to claim 15, wherein the device commands comprise phases of a communications protocol.

17. A method according to claim 16, wherein the communications protocol is a bulk-only transport protocol.

18. A method according to claim 16, wherein the phases comprise a command phase, a data phase, and a status phase.

19. A method according to claim 15, wherein the USB frame is an interrupt threshold period.

20. A method according to claim 19, wherein the interrupt threshold period is approximately 1 ms.

21. A USB host, comprising:
    a transmitter transmitting a plurality of USB device commands to a USB device, the plurality of USB device commands including a command phase, a data phase and a status phase;
    wherein the transmitter is preconfigured to transmit the plurality of USB device commands asynchronously during a single USB frame without an idle period between each transmission.

22. A method according to claim 1 wherein the first and second phases are transmitted asynchronously.

23. A method according to claim 1 wherein the first and second phases are transmitted without an idle period between transmissions.

24. The system according to claim 10 wherein the transmission system is further configured to transmit the first and second communications phases without dead time between transmissions.

25. The system according to claim 10 wherein the transmission system is further configured to transmit the first and second communications phases without latency between transmissions.

* * * * *